(12) United States Patent
Short

(10) Patent No.: US 6,481,191 B1
(45) Date of Patent: Nov. 19, 2002

(54) GANG MOWER

(76) Inventor: Douglas Jay Short, 2523 Green Ash Ct., Ft. Wayne, IN (US) 46845

(*) Notice: Subject to any disclaimer, the term of this patent is extended or adjusted under 35 U.S.C. 154(b) by 0 days.

(21) Appl. No.: 09/484,920

(22) Filed: Jan. 18, 2000

Related U.S. Application Data

(63) Continuation-in-part of application No. 09/211,375, filed on Dec. 14, 1998, now Pat. No. 6,058,687, which is a continuation of application No. 08/860,682, filed on Jun. 10, 1997, now Pat. No. 5,865,017, which is a continuation of application No. 08/370,664, filed on Jan. 10, 1995, now Pat. No. 5,497,603.

(51) Int. Cl.$^7$ .............................................. A01D 75/30
(52) U.S. Cl. ............................................. 56/7; 56/15.9
(58) Field of Search ........................ 56/7, 6, 14.7, 15.9, 56/16.3; 280/442, 400; 180/235, 403

(56) References Cited

U.S. PATENT DOCUMENTS

| | | | |
|---|---|---|---|
| 1,260,631 A | | 3/1918 | Braun |
| 1,279,266 A | | 9/1918 | Coldwell |
| 1,373,981 A | * | 4/1921 | Smith |
| 1,562,709 A | * | 11/1925 | McNitt |
| 1,607,378 A | | 11/1926 | Worthington |
| 1,663,900 A | | 3/1928 | Braun |
| 1,725,375 A | | 2/1929 | Seeley |
| 1,712,722 A | | 5/1929 | Worthington |
| 1,818,487 A | | 8/1931 | Lontz |
| 1,900,726 A | | 3/1933 | Moyer |
| 1,902,928 A | | 3/1933 | Worthington |
| 1,957,079 A | * | 5/1934 | Ronning |
| 2,067,158 A | | 1/1937 | Moyer |
| 2,082,647 A | * | 6/1937 | Moe |
| 2,099,902 A | | 11/1937 | Moyer et al. |
| 2,111,016 A | | 3/1938 | Worthington |
| 2,139,200 A | | 10/1938 | Moyer |
| 2,168,706 A | | 8/1939 | George et al. |
| 2,177,189 A | | 8/1939 | Roseman |
| 2,426,652 A | * | 9/1947 | Storey |

(List continued on next page.)

FOREIGN PATENT DOCUMENTS

| | | |
|---|---|---|
| GB | 397726 | 8/1933 |
| GB | 714138 | 8/1954 |
| GB | 1093251 | 11/1967 |
| GB | 1241751 | 8/1971 |
| GB | 1 245 091 | 9/1971 |
| GB | 1 245 092 | 9/1971 |
| GB | 1 542 661 | 3/1979 |
| GB | 2842739 | 4/1980 |
| GB | 9312843.6 | 2/1994 |

OTHER PUBLICATIONS

Author: Unknown. Title Of Publication: Toro Catalog. Title Of Article: Toro Standard Five Unit Push Type Tractor. Place Of Publication: Believed To Be U.S.A. Date Of Publication: Unknown, No. of pages: 33.

Author: A Grifpb, Inc. Title: Owners Manual For 21 Gang Reel, Model No.'S 45–0194,95, No. Of pp.: 8. Date Published: 1991, Place Of Publication: Believed To Be U.S.

Author: American Lawnmower. Title: Color Photographs Of A Horse Drawn Gang Mower. No. Of Pages: 2. Date Of Photo: Believed To Be 1998. Photos Not Believed To Have Been Published But The Mower In The Photos Is Alleged To Have Been On Sale And In Public Use In The U.S.

Author: Unknown. Title: Power Mower Section. No. Of pp: 2; pp. 26 and 27. Date Published: Unknown. Place Of Publication: Believed To Be U.S.

Author: Worthington. Title: Worthington Rough Grass Blitzer Brochure. No. of pp.: 2. Date Published: Unknown. Place Of Publication: Believed To Be U.S.

Primary Examiner—Robert E. Pezzuto
Assistant Examiner—Meredith Petravick
(74) Attorney, Agent, or Firm—Liell & McNeil

(57) ABSTRACT

A gang mower and tractor assembly includes a tractor with a forward section attached to a rear section by a pivot. A frame is attached to the forward section. A plurality of reel type mowers are attached to the frame.

19 Claims, 8 Drawing Sheets

U.S. PATENT DOCUMENTS

| | | | |
|---|---|---|---|
| 2,653,437 A | * | 9/1953 | Crump |
| 2,659,190 A | | 11/1953 | Innst |
| 2,704,921 A | | 3/1955 | Cunningham, Jr. |
| 2,724,227 A | | 11/1955 | Godwin |
| 2,725,703 A | | 12/1955 | Roseman, Jr. |
| 2,830,421 A | | 4/1958 | Blue et al. |
| 3,038,286 A | | 6/1962 | Hall |
| 3,058,280 A | | 10/1962 | Lewis |
| 3,106,811 A | | 10/1963 | Heth et al. |
| 3,224,176 A | | 12/1965 | Taylor |
| 3,429,109 A | | 2/1969 | Heth et al. |
| 3,472,005 A | | 10/1969 | Profenna |
| 3,581,480 A | | 6/1971 | O'Connor et al. |
| 3,612,573 A | | 10/1971 | Hoffman |
| 3,613,337 A | | 10/1971 | Akgulian et al. |
| 3,646,733 A | | 3/1972 | Clapsaddle, Jr. |
| 3,650,096 A | | 3/1972 | Caldwell |
| 3,668,847 A | | 6/1972 | Van Ausdell |
| 3,759,019 A | | 9/1973 | Wells |
| 3,771,296 A | | 11/1973 | Sorenson et al. |
| 3,808,778 A | | 5/1974 | Hoffmeyer et al. |
| 3,832,835 A | | 9/1974 | Hall et al. |
| 4,021,996 A | | 5/1977 | Bartlett et al. |
| 4,028,868 A | | 6/1977 | Zehrung, Jr. |
| 4,064,679 A | | 12/1977 | Spinner |
| 4,072,001 A | | 2/1978 | Aldred |
| 4,287,706 A | | 9/1981 | Tobin, Jr. |
| 4,330,981 A | | 5/1982 | Hall et al. |
| 4,384,443 A | | 5/1983 | Hoogstrate |
| 4,769,976 A | | 9/1988 | Bassett et al. |
| 4,947,630 A | | 8/1990 | Rich et al. |
| 5,042,236 A | | 8/1991 | Lamusga et al. |
| 5,197,267 A | | 3/1993 | Aldred et al. |
| 5,209,320 A | * | 5/1993 | Harrer |
| 5,228,277 A | | 7/1993 | Smith et al. |
| 5,343,680 A | | 9/1994 | Reichen et al. |
| 5,459,984 A | | 10/1995 | Reichen et al. |

* cited by examiner

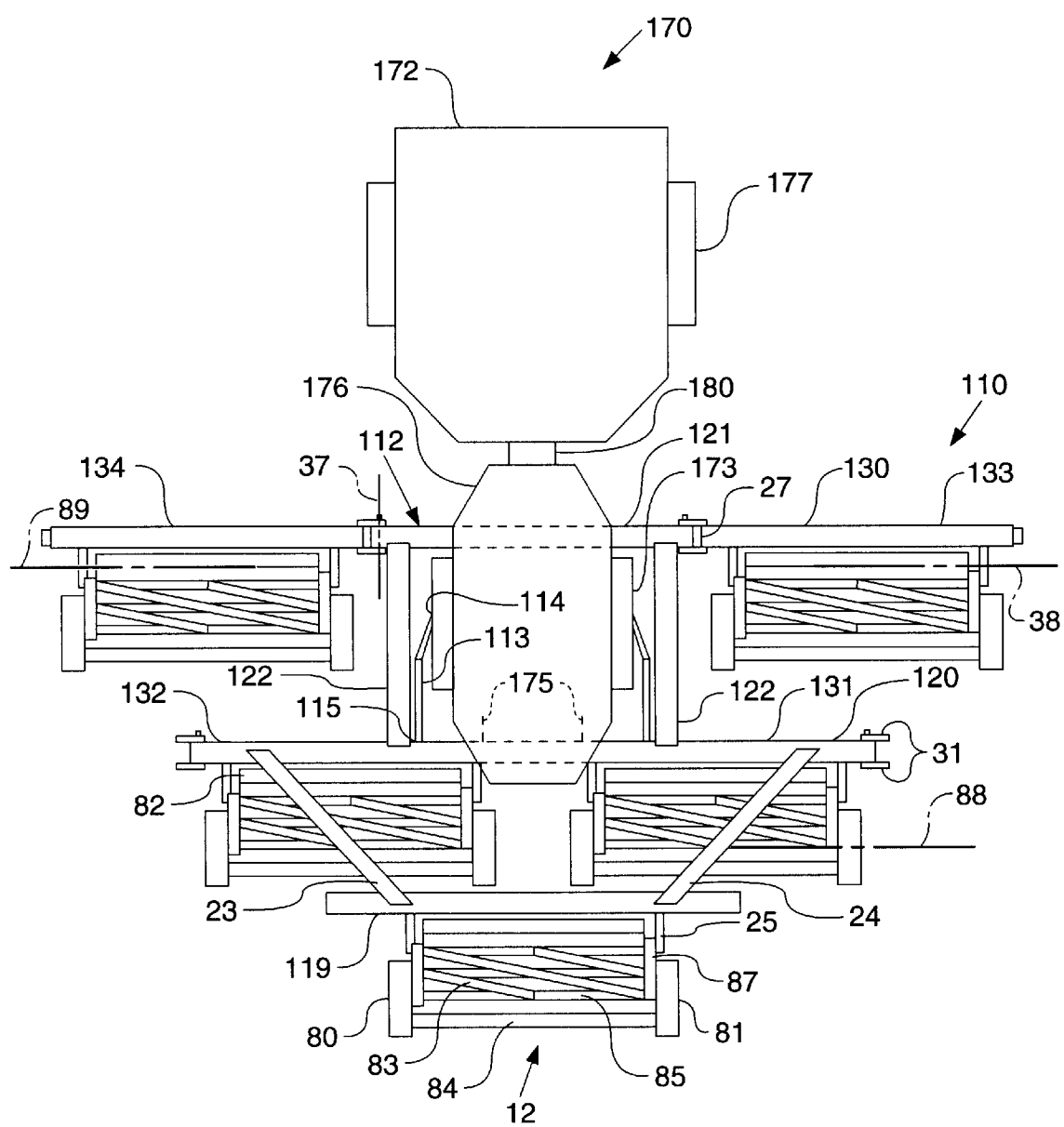

GANG MOWER

RELATION TO PRIOR APPLICATIONS

This application is a continuation-in-part of U.S. patent application Ser. No. 09/211,375, filed on Dec. 14, 1998, and entitled Gang Mower, now U.S. Pat. No. 6,058,687, which was a continuation of U.S. patent application Ser. No. 08/860,682, filed Jun. 10, 1997, and entitled Gang Mower, now U.S. Pat. No. 5,865,017, which was a continuation of U.S. patent application Ser. No. 08/370,664, filed Jan. 10, 1995, and entitled Gang Mower, now U.S. Pat. No. 5,497,603.

TECHNICAL FIELD

The present invention relates generally to garden tractor accessories, and in particular to gang mowers.

BACKGROUND OF THE INVENTION

Gang mowers have long been known in the art, and are most often identified with golf courses and other wide open areas requiring an attractive contoured cut. Gang mowers are often recognized for their ability to mow a given area in a significantly shorter amount of time than that possible with conventional powered deck mowers. This is due in part to the relatively large swath (8 feet or more) possible with gang mowers, whereas deck mowers typically cut a swath of four feet or less with each pass. However, most previous gang mowers include a frame that attaches to the rear portion of a tractor and is moved behind the same. While these rear mounted gang mowers have performed effectively, there are some drawbacks associated with their use. For instance, because the mower units follow the tractor, one or more paths from the tractor's tires are flattened in the grass before the grass is cut by the mower units. Therefore, unevenly mowed patches of grass can result. Additionally, because the mower units are behind the user, he or she must turn toward the rear of the mower, and away from the direction the tractor is being driven, to monitor the condition of the mower units and mowing progress. This can add unnecessary time and inconvenience to the mowing process.

Previous front mounted mowers have been designed to correct some of the drawbacks set out above. However, when one of these mowers has been mounted on the front of a tractor, they have been found to be difficult to steer. This is because, without an additional means to turn the mower units, such as a hydraulic system, the tractor and frame turn, but the wheels of the mower units tend to slide along the ground. Thus, once again, patches of grass become flattened prior to cutting.

The present invention is directed to overcoming one or more of the problems set forth above.

SUMMARY OF THE INVENTION

In one aspect of the present invention, a gang mower frame comprises a first sub-frame attached to, and arranged in front of, a second sub-frame. A plurality of mower attachment brackets are attached to the first sub-frame. The second sub-frame includes at least one tractor attachment bracket.

In another aspect of the present invention, a gang mower comprises a frame includes at least one tractor attachment bracket that has a tractor attachment end. A plurality of reel-type mowers are attached to the frame. Each of the reel-type mowers including at least one forward drive wheel that is operably coupled to a rotating cutting reel. The tractor attachment end of the tractor attachment bracket is behind at least one of the reel-type mowers.

In yet another aspect of the present invention, a front mounted gang mower and tractor assembly comprises a tractor that includes a forward section and a rear section, wherein the forward section and the rear section are attached by a pivot. A frame is attached to the forward section of the tractor. Attached to the frame are a plurality of reel-type mowers.

BRIEF DESCRIPTION OF THE DRAWINGS

FIG. 10 is a top view of a front mounted gang mower according to another embodiment of the present invention.

DETAILED DESCRIPTION OF THE PREFERRED EMBODIMENTS

Figure 1:
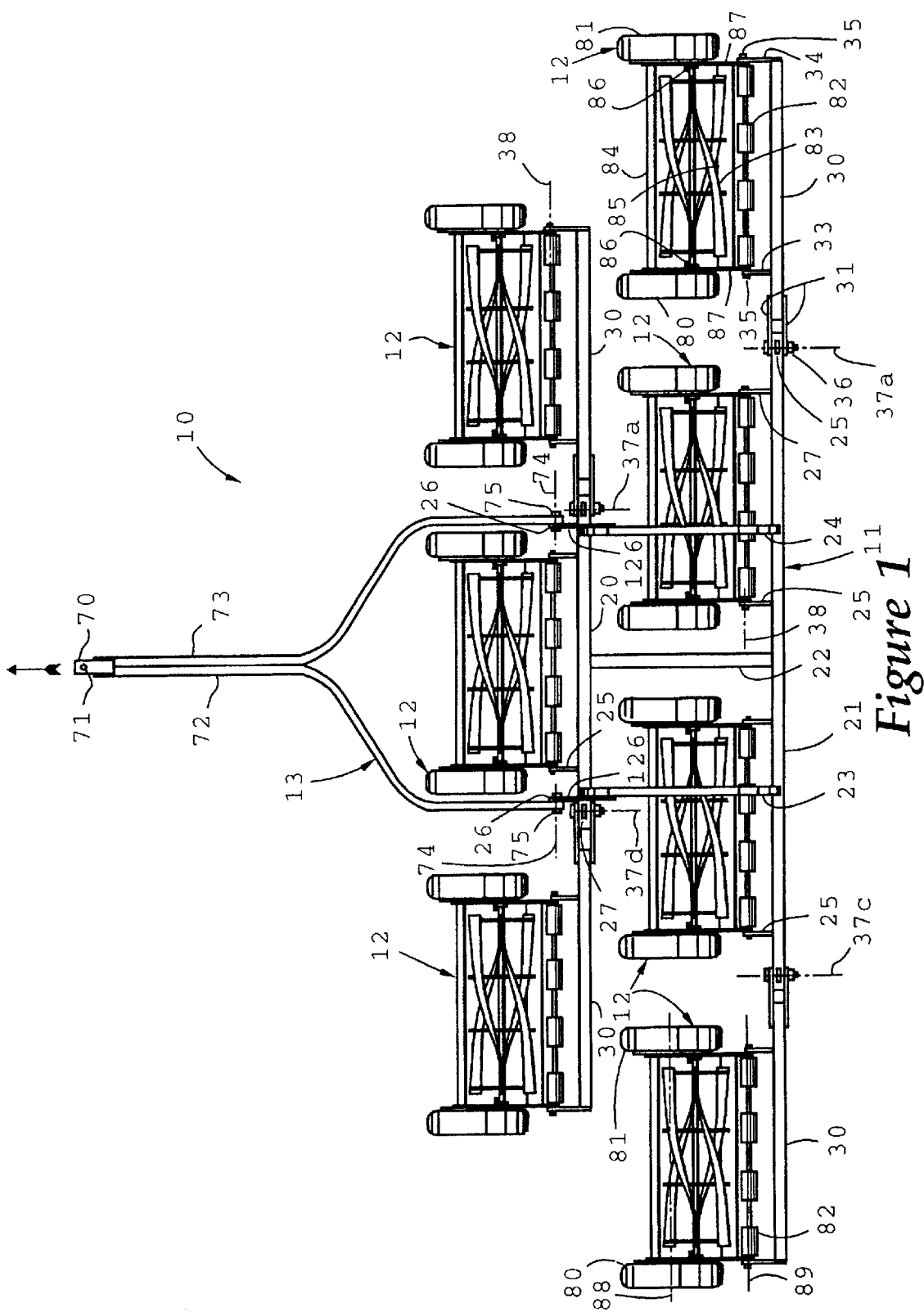
FIG. 1 is a top view of a gang mower for garden tractors.
Figure 2:
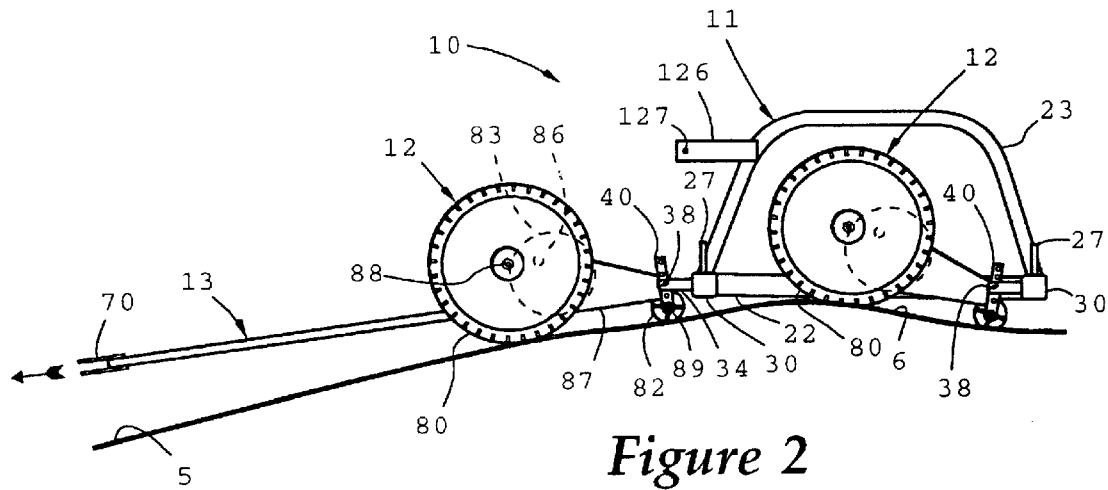
FIG. 2 is a side elevational view of the gang mower of FIG. 1.

Referring now to FIG. 1, a gang mower for garden tractors 10 includes a frame 11, a hitch 13 and seven individual reel-type mower units 12. Frame 11 preferably includes a central portion made up of a forward sub-frame 20 and a rearward sub-frame 21 arranged behind and substantially parallel to the forward sub-frame. Sub-frames 20 and 21 are preferably interconnected by a horizontal stiffener 22 and a pair of arched stiffeners 23 and 24. Forward sub-frame 20, rearward sub-frame 21 and horizontal stiffener 22 are preferably made from square metal tubing welded to one another in a conventional manner. Arched stiffeners 23 and 24 are preferably formed from square steel bar stock and welded at each end to the forward and rearward sub-frames. The preferred shape of the arched stiffeners 23 and 24 is best illustrated in FIG. 2.

A pair of mower attachment brackets 25 are preferably welded to extend forward of forward sub-frame 20, and serve as a means by which the central mower in the front row is attached to the frame. Likewise, four substantially identical brackets 25 are preferably welded to extend forward of the rearward sub-frame 21, and serve as a means by which the central two mower units 12 in the second row are attached to the frame. Brackets 25 are preferably cut from steel bar stock, on the order of at least one quarter inch thick, and welded into place. Each of brackets 25 includes a bore that facilitates attachment of the individual mower units 12 through a pin arrangement (best illustrated in FIG. 4) that permits the individual mower units to pivot with respect to the frame about horizontal pivot axes 38. This aspect of the invention allows the individual mower units to independently pivot and follow contours 6 encountered as the gang mower is moved forward over the ground 5, as shown in FIG. 2.

Hitch 13 is preferably attached to frame 11 via a pair of brackets 26 that are substantially similar to brackets 25 discussed earlier. Brackets 26, which are partially obscured in FIG. 1 by upper brackets 126, are welded to, and extend forward from, forward sub-frame 20. When the gang mower is reduced to three central mower units and the mower is to be moved by a draft animal, upper brackets 126 (see also FIG. 2) are used as the mounting location for hitch 13 via bore 127. Upper brackets 126 are welded to arched stiffeners 23 and 24. Hitch 13 preferably includes a pair of symmetrically bent square steel bars 72 and 73. Bars 72 and 73 are bent generally into the shape shown in FIG. 1 and are preferably welded at a number of locations along their contact surfaces. A pair of flanges 70 are attached to one end of bar 72 and 73. Flanges 70 are preferably made from steel bar stock on the order of about one quarter inch in thickness and are machined to include a bore 71, which facilitates hitching the gang mower to an ordinary garden tractor in a conventional manner. The other end of bars 72 and 73 include a bore (not shown) which facilitates the attachment of hitch 13 to brackets 26 via a pair of nut/bolts 75. Thus, hitch 13 preferably has the ability to pivot with respect to frame 11 about axis 74 to better facilitate the gang mower following contours when going over the top of hills or the bottom of valleys between hills. Furthermore, this feature allows the hitch to be pivoted to an upright stowed position (FIG. 3) to better facilitate storing the gang mower in a relatively small space.

Attached to the rigid central frame 11 are four outer sub-frames 30. In particular, FIG. 1 shows a forward left sub-frame, a forward right sub-frame, a rearward left sub-frame and a rearward left sub-frame. Although the outer sub-frames 30 are located in different positions and inverted with respect to one another, their individual structures are substantially identical. In particular, each outer sub-frame 30 preferably includes a length of square tubular stock welded adjacent one end to a pair of extension members 31, which are preferably cut from a length of steel bar stock on the order of about one quarter inch in thickness. Extensions 31 each preferably include a bore that permits attachment to the central frame 11 via a nut/bolt set 36, as best shown in FIG. 4. This permits the outer sub-frames to pivot about individual horizontal axes 37a–d. This allows the outer mower units to float with the contour of the lawn independently of one another. Also, outer sub-frames 30 have the ability to pivot to an upright stowed position (FIGS. 3 and 4) in order to better facilitate storage of the gang mower in a relatively small space. Outer sub-frames 30 also preferably include a pair of brackets 33 and 34 which are substantially similar to brackets 25 discussed earlier, except that bracket 34 is slightly longer and welded to one end of the particular outer sub-frame 30. Brackets 33 and 34 preferably include a bore that facilitates an attachment of a mower unit 12 via a pin arrangement that permits pivoting about a horizontal axis 38. Thus, the outer sub-frames can pivot about first horizontal axes 37a–d and each of the mower units can pivot about a separate and perpendicular horizontal axis 38. This permits the outer mower units to have two degrees of rotational freedom so that gang mower 10 can easily follow virtually any ground contour.

The individual reel-type mower units 12 are commercially available from a variety of known sources, and often can be utilized without modification in the present invention. Each mower unit includes a pair of forward drive wheels 80 and 81 that define a localized forward axis 88. Each mower also preferably includes a rear roller 82 with the ability to rotate about a localized rearward axis 89. Real roller 82 and forward drive wheels 80, 81 are preferably interconnected via a pair of supports 87. Rotating blades 83 are attached between supports 87 and are driven to rotate adjacent cutting reel 85 when forward drive wheels 80 and 81 are rotated in the forward direction. A stabilizer bar 84 extends between brackets 87, and apparently serves to give the individual mower unit 12 greater rigidity. The mower units sometimes include a pair of handle mounting studs 86 which will be discussed infra in relation to FIG. 5. Thus, mower units 12 can be "off the shelf" components except that the individual handles for the reel-type mowers are excluded. Cutting height can be adjusted by connecting the rear roller 82 to different locations along height adjustment bracket 40 (see FIG. 2 and 5). Height adjustment brackets are positioned and attached within a channel on supports 87.

The gang mower of the present invention permits a portion of the individual mower units 12 to pivot about a pair of mutually perpendicular horizontal axes with respect to one another. Furthermore, the pivoting ability of the hitch better facilitates cutting over the top and at the bottom of relatively steep hills. However, it should be noted that preferably the mower units have little or no ability to rotate with respect to one another about any vertical axis. This permits the user to back up the gang mower 10 without risking the jack-knifing problems encountered with prior art mower units that have the ability to rotate with respect to one another about a vertical axis. This feature also permits the mower to effectively complete zero radius turns while maintaining the proper overlapping cutting arrangement afforded by the two staggered rows of gang mowers shown in FIG. 1.

Figure 9:
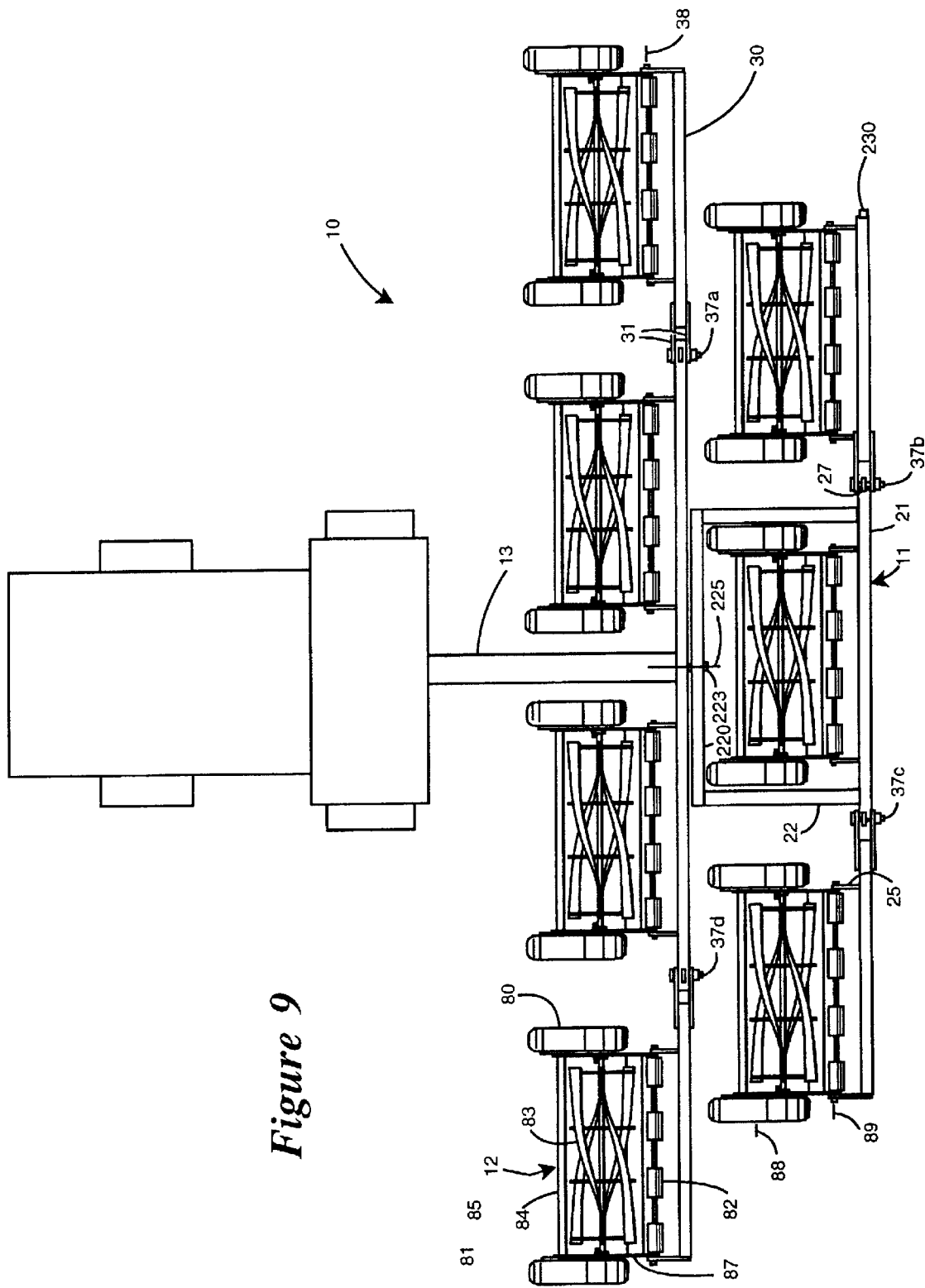
FIG. 9 is a top view of a rear mounted gang mower for garden tractors.

Although the gang mower 10 shown in FIG. 1 includes seven individual mower units 12, it can also utilize either five or three mowers if a thinner mower swath is desirable. In its basic form, preferably only the central frame 11 is included with three individual mower units, giving the overall gang mower a cutting swath on the order of about four feet. The next extension up to approximately a six foot cutting swath is accomplished by adding a pair of outer sub-frames 30 to forward sub-frame 20 as discussed earlier. Such a configuration would have three mowers in the front row and two mowers in the back row and have a cutting swath on the order of about six feet or more. The next enhancement comes by adding another pair of mower units 12 to the rearward sub-frame 21 via another pair of outer sub-frames 30. In addition to these enhancements, gang mower 10 could include seven mower units 12, such that four mowers are in the front row and two mowers are in the back row (See FIG. 9). Thus, it should be clear that gang mower 10 has the versatility to accommodate several different cutting swaths to suit virtually any individual user. Furthermore, maintenance on gang mower 10 is relatively low since the individual mower units can be replaced at a relatively low cost and the underlying frame is virtually maintenance free. Prior art mower units are typically specially modified for use in the gang mower and often require costly maintenance and repairs when problems occur.

Figure 3:
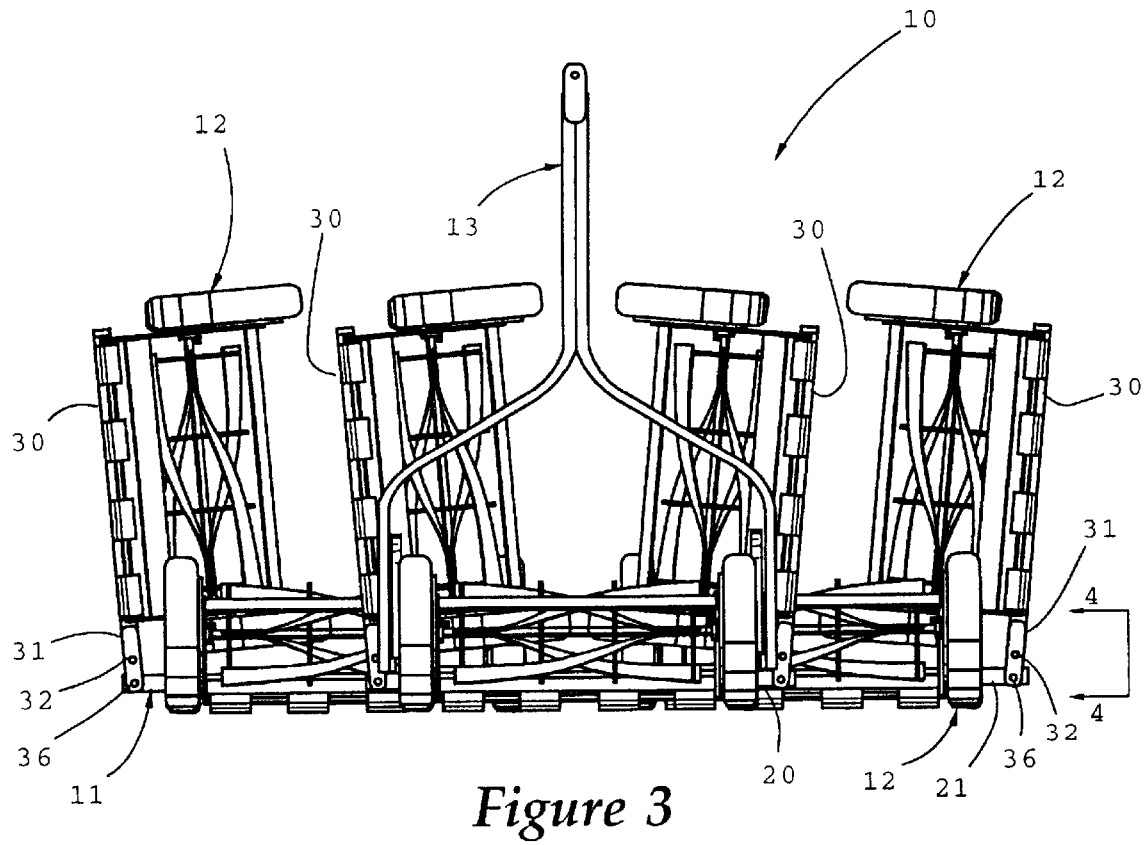
FIG. 3 is a front elevational view of the gang mower of FIG. 1 in its stowed configuration.
Figure 4:
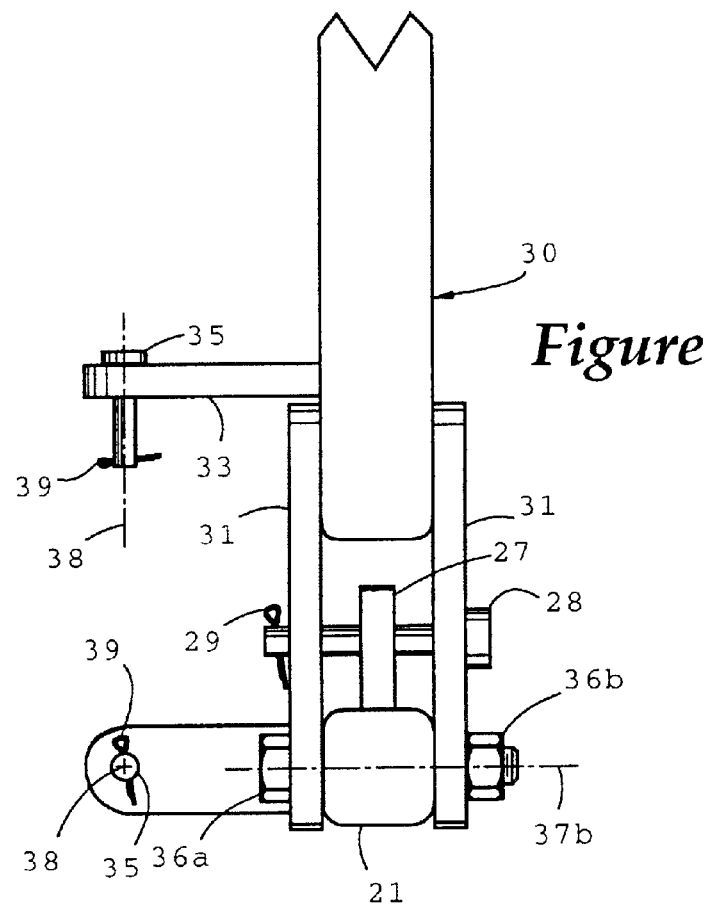
FIG. 4 is an enlarged side elevational view of a portion of a gang mower frame according to the present invention.

FIG. 3 shows the gang mower 10 of FIG. 1 in its stowed configuration for storage. Each of the outer sub-frames 30 preferably has the capability of pivoting about its individual axis 37a–d (FIG. 1) to an upright stowed position. The outer sub-frames 30 can be locked in their stowed configuration via the pin arrangement illustrated in FIG. 4. In particular, at the connection with each outer sub-frame 30 an upright bracket 27 is welded to the underlying sub-frame 20 or 21 (see FIGS. 1, 2 and 4). Upright brackets 27 each preferably include a bore which aligns with bores made through extensions 31. When in the stowed configuration, these bores align and permit the insertion of a pin 28 which is kept in place via a retaining pin 29, or another equivalent arrangement known in the art. Thus, each of the outer units is locked in an upright stowed position and the hitch is pivoted to an upright stowed position when it is desired to store the gang mower. If proper clearances are maintained, the gang mower can still be moved forward or pushed in reverse when in its stowed configuration as shown in FIG. 3. In such a case, the weight of the gang mower, which is typically on the order of about 200 pounds, is supported by the three central mower units. Thus, the user can quickly pivot and lock the outer mower units to their stowed configuration and simply back the gang mower into a storage place within a garage or barn. Gang mower 10 takes up the space about equal to that of a motorcycle when in its stowed configuration, or less than half the space of its deployed configuration as shown in FIG. 1.

FIG. 4 is an enlarged view illustrating the interconnection between rearward right sub-frame 30 and rearward sub-frame 21. Nevertheless, the attachment of each outer sub-frame to the central frame is identical since all the outer sub-frames are structurally identical. As discussed earlier, the framing is preferably attached to the individual mower units via a pin arrangement 35 that permits the mower units to pivot about an axis 38. Outer sub-frame 30 is attached to rearward sub-frame 21 via aligning bores (not shown) which receive a bolt 36a. The bolt is preferably secured in place with a conventional nut 36b. When the outer sub-frame 30 is pivoted to its upright stowed configuration, the bores in extensions 31 and upright bracket 27 align and permit the insertion of a pin 28. Pin 28 is preferably held in place via a removable retaining pin 29 that is inserted through a hole in one end of pin 28. When the outer sub-frames 30 are lowered into their deployed configuration, pin 28 is reinserted through bracket 27 and left in place until needed. The pin and retaining pin arrangement shown for attaching the frames to the individual mower units and for locking the outer sub-frames in an upright position could have a variety of other mechanical connections substituted therefore which are known in the art. For instance, a nut and bolt arrangement could be substituted for each of the pin/retaining pin connections illustrated.

Figure 5:
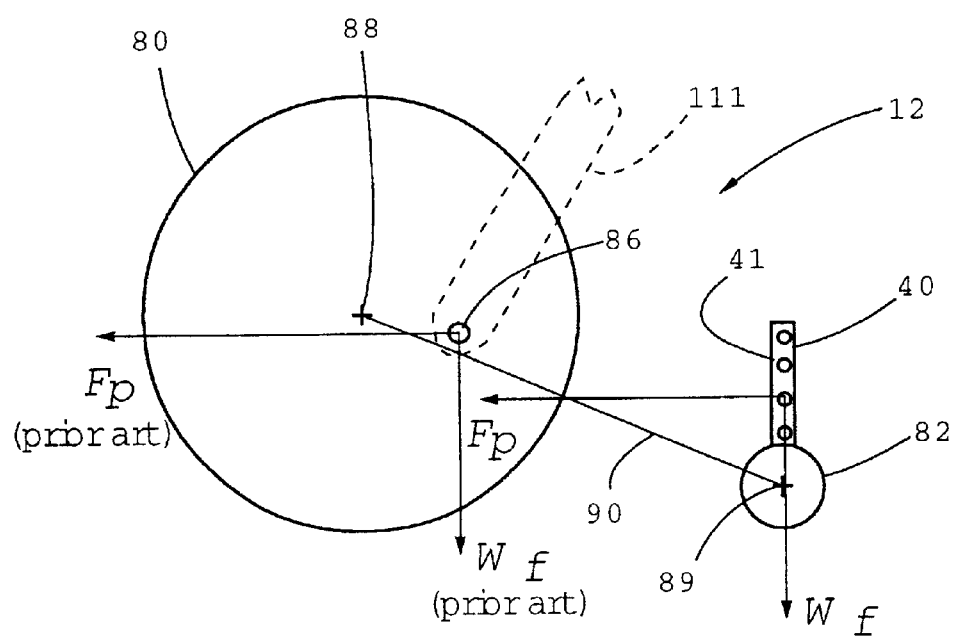
FIG. 5 is a side diagrammatic illustration of a reel-type mower unit contrasting the force distribution of the frame of the present invention versus that of the prior art.

Referring now to FIG. 5, the force distribution aspect of the present invention is contrasted with that of the closest known prior art (U.S. Pat. No. 4,287,706 to Tobin, Jr.). In particular, FIG. 5 shows a diagrammatic view of a mower unit 12 having a forward wheel 80 that is rotatable about a forward axis 88. The rear roller 82, which is rotatable about a rearward axis 89 is preferably attached to the forward mower via a height adjusting bracket 40. The present invention is preferably attached directly above rearward axis 89 so that most of the weight of the frame (Wf) is supported by the rear rollers. Although the present invention would perform well with the mowers attached either for or aft of rearward axis 89, attaching directly above rearward roller 82 is the most easily facilitated because height adjusting bracket 40 typically includes several bores for adjusting the height of rollers 82. It is also important to note that the frame is preferably attached lower than forward axis 88 but higher than rearward axis 89. The result being that the force (Fp) supplied by moving or pushing the gang mower always intersects a line 90 connecting axis 88 and axis 89. Preferably, the combined force from Fp and Wf intersects line 90 so that the drive wheels are leveraged downward while maintaining the roller in contact with the ground. Thus, the present invention contemplates a wide variety of attachment locations, including ones above axis 88, provided that an adequate force balance is maintained to drive the front wheels and maintain the rear roller in contact with the ground. The result being that each individual mower unit is leveraged downward when moved forward to increase the friction contact between drive wheels 80, 81 and the ground. This contrasts with the Tobin connection via a bracket 111 that attaches to handle studs 86. Handle studs 86 are typically located relatively close to forward axis 88. Thus in the Tobin mower, the majority of the frame's weight is supported by the forward wheels rather than the rear roller. The consequence being that the rear roller tends to bounce along the ground when the Tobin mower is moved forward. Tobin attempted to eliminate this problem by including a spring which constantly supplies a restoring moment to maintain the rollers in contact with the ground. The present invention solves the roller bouncing problem inherent in the Tobin gang mower.

It should be appreciated that while the present invention has been shown with mower units 12 being attached to the frame at a location closer to the rear rollers 82 than the forward drive wheels 80, 81, the present invention contemplates solving the roller bouncing problem by placing sufficient force on rear rollers 82 to keep them in contact with the ground. In other words, because. the cutting real is located at a fixed distance from the ground when rear roller 82 and forward drive wheels 80, 81 are on the ground, it is important that a sufficient amount of the weight of frame 11 is supported by rear roller 82 to keep it on the ground. While the present invention has been illustrated supporting a majority of the weight of the frame by rear rollers 82 by attaching the frame closer to rear rollers 82 than forward drive wheels 80, 81, the location of the attachment of the frame to mower units 12 is only important in relation to the downward force acting on rear roller 82. In other words, so long as a sufficient downward force is acting on rear roller 82 to keep the same on the ground during cutting, it should be appreciated that frame 11 could be attached to mower units 12 at any point between rear roller 82 and forward drive wheels 80, 81.

Figure 6:
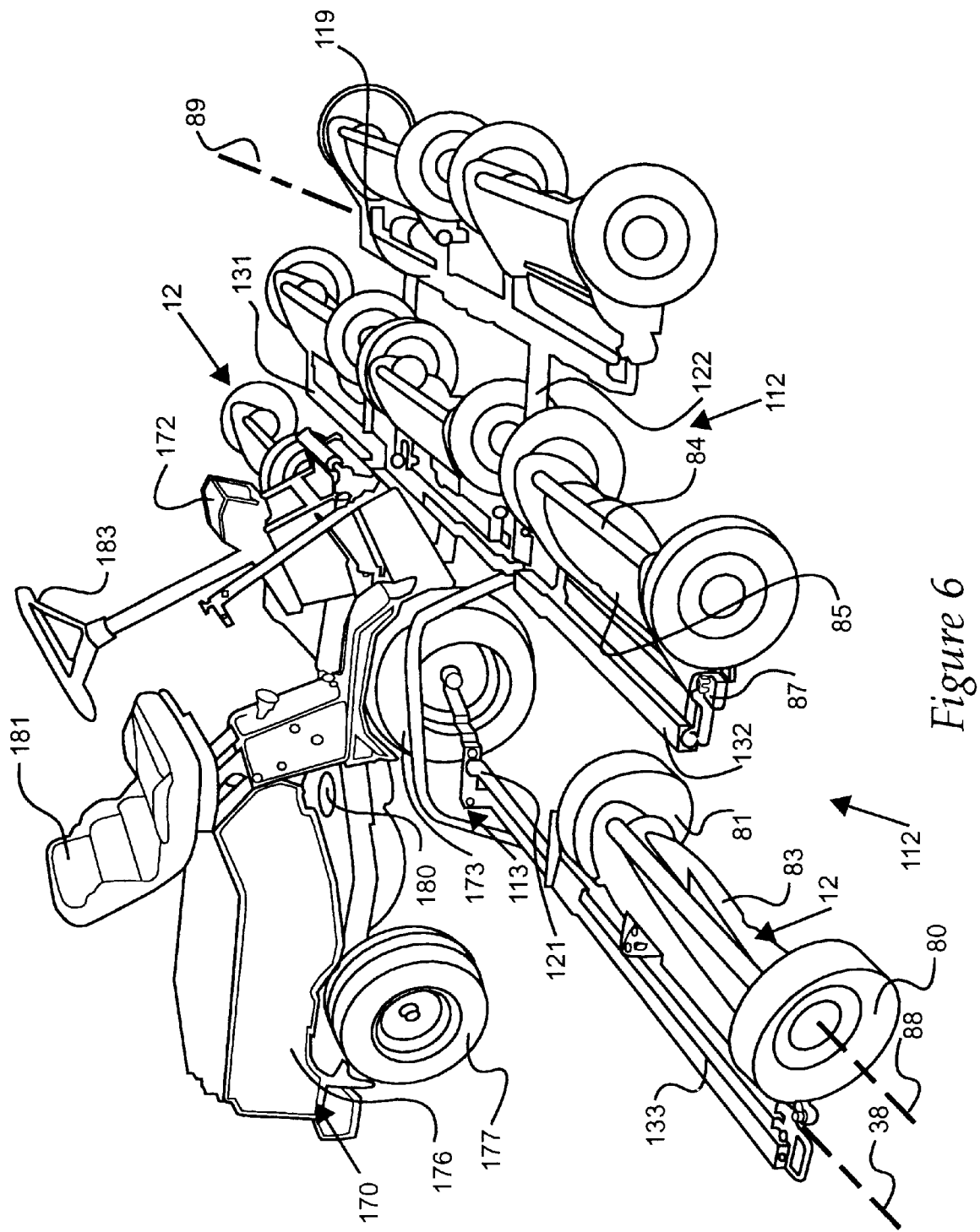
FIG. 6 is a side perspective view of a front mounted gang mower and tractor assembly according to the present invention.
Figure 7:
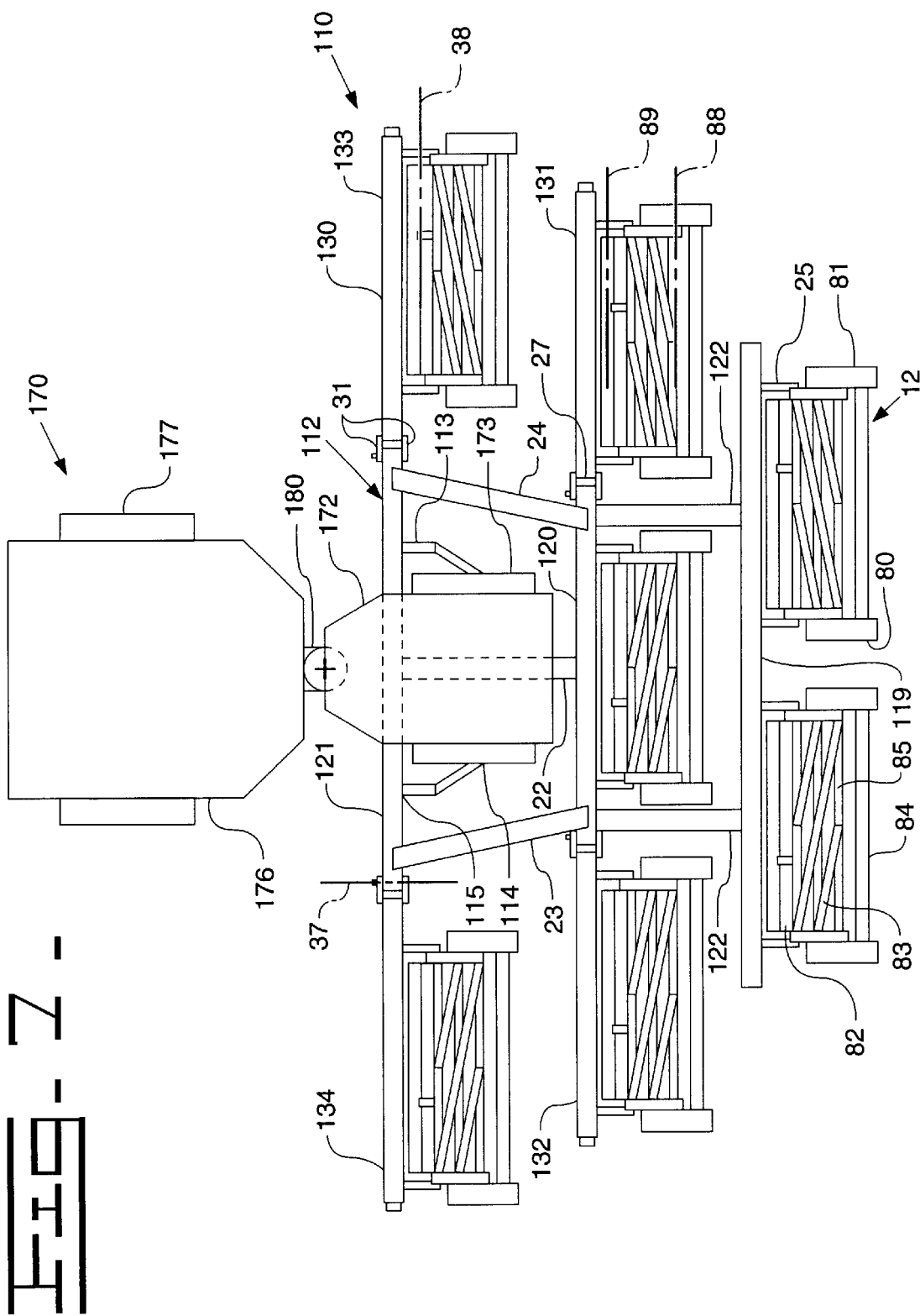
FIG. 7 is a top view of the front mounted gang mower and tractor assembly of FIG. 6.
Figure 8:
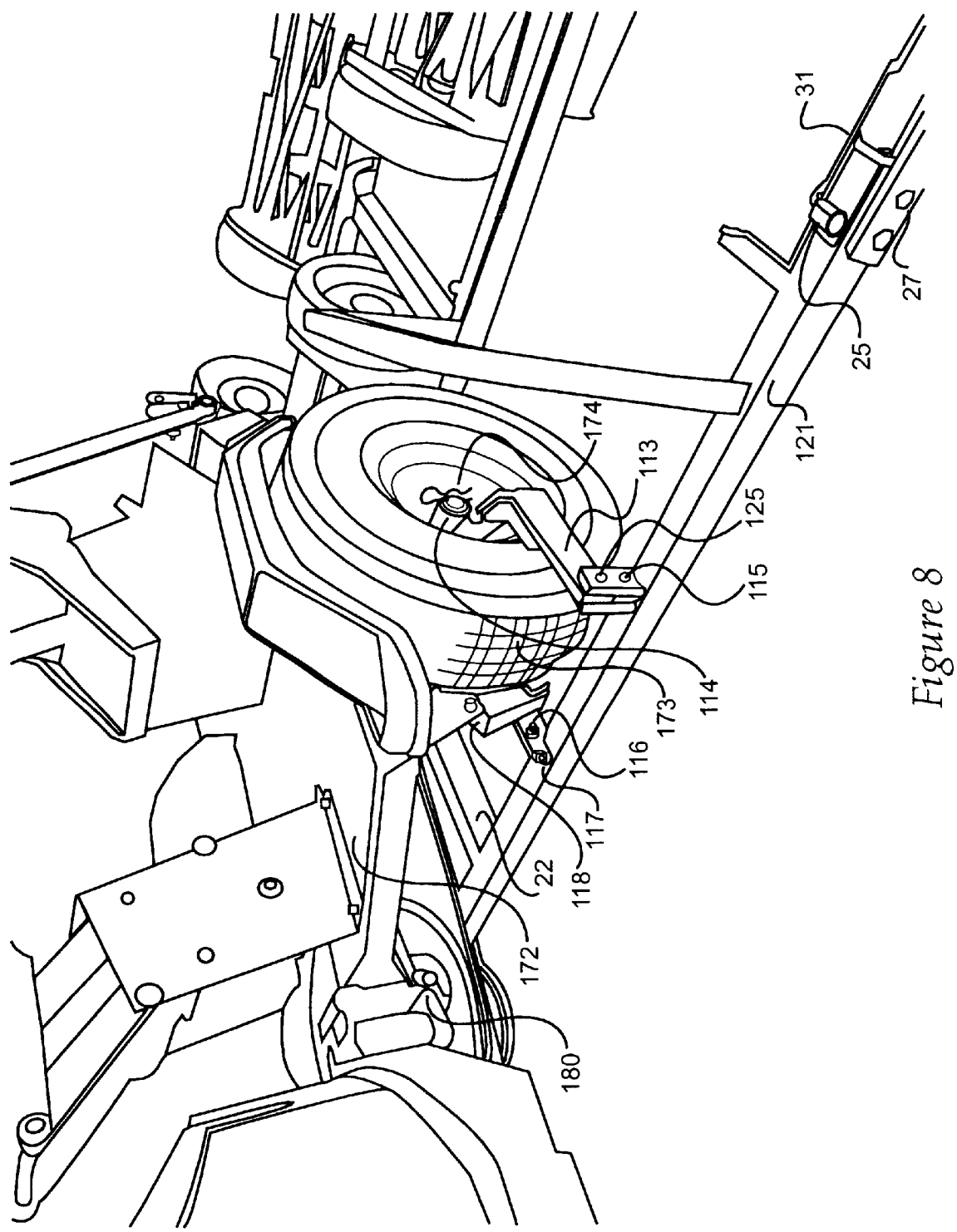
FIG. 8 is a partial perspective side view of a tractor attachment bracket of the front mounted gang mower and tractor assembly of FIG. 6.

Referring now to FIG. 6–8, there is shown a front mounted gang mower 100 according to the present invention. Several features of gang mower 100 are similar to those included on gang mower 10 and therefore like numbers will be used to designate like features. Gang mower 100 preferably includes a frame 112 that preferably includes a first sub-frame 120 that is attached to, and arranged in front of, a second sub-frame 121. Second sub-frame 121 is preferably attached to first sub-frame 120 via a horizontal stiffener 22 and a pair of arched stiffeners 23, 24 that are welded to the sub-frames in a conventional manner. Frame 112 also preferably includes a forward sub-frame 119 that is attached to, and arranged in front of, first sub-frame 120. First sub-frame 120 is preferably attached to forward sub-frame 119 by a pair of horizontal stiffeners 122 that are welded to the sub-frames in a conventional manner. Horizontal stiffeners 122 are similar to horizontal stiffener 22 described and shown in FIG. 1, and can best be seen in FIG. 6.

A pair of mower attachment brackets 25 are preferably welded to first sub-frame 120 and extend toward forward sub-frame 119. Mower attachment brackets 25 are sized and positioned for attachment to a reel-type mower unit 12 of the kind previously described. Each of the brackets 25 preferably includes a bore that facilitates attachment of the individual mower units 12 through a pin arrangement that permits the individual mower units to pivot with respect to the frame about a pivot axes 38. This aspect of the invention allows the individual mower units to independently pivot and follow contours 6 encountered as gang mower 110 is pushed forward over the ground 5.

Preferably attached to first sub-frame 120 are a first right sub-frame 131 and a first left sub-frame 132. Similarly, a second right sub-frame 133 and a second left sub-frame 134 are preferably attached to second sub-frame 121. While these outer sub-frames 130 are located in different positions and inverted with respect to one another, their individual structures are substantially identical. Outer sub-frames 130 are also similar in size and structure to sub-frames 30, described herein. In particular, each outer sub-frame 130 preferably includes a length of square tubular stock that is welded adjacent one end of a pair of extension members 31. Recall that extensions 31 each preferably include a bore that permits attachment to the central sub-frames 120, 121 via a nut/bolt set 36 (See FIG. 4). This allows the outer mower units to float with the contour of the lawn independently of one another. Outer sub-frames 130 each also preferably include a pair of brackets 33 and 34 which are substantially similar to brackets 25, except that bracket 34 is slightly longer and welded to one end of the particular outer sub-frame 130. Two pairs of brackets 33, 34 are also included on forward sub-frame 119 for attachment to reel-type mower units 12. Brackets 33, 34 preferably include a bore that facilitates an attachment of a mower unit 12 via a pin arrangement that permits pivoting about a horizontal axis 38. Thus, the outer sub-frames 130 can pivot about first horizontal axes 37a–d and each of the mower units can pivot about a separate and perpendicular horizontal axis 38. This permits the outer mower units to have two degrees of rotational freedom so gang mower 100 can easily follow virtually any ground contour.

As with gang mower 10, gang mower 110 is preferably capable of being converted to a stowed configuration for storage. Each of the outer sub-frames 130 are preferably capable of pivoting about their individual horizontal axes 37a–d to an upright stowed position. Each also preferably includes an outer handle to help facilitate movement between the deployed and stowed configurations. Outer sub-frames 130 can be locked in their upright stowed position via the pin arrangement illustrated in FIG. 4, and described herein for outer sub-frames 30 of gang mower 10. An upright bracket 27 is preferably welded to first sub-frame 120 and second sub-frame 121 at each of the connection points with first right sub-frame 131, first left sub-frame 132, second right sub-frame 133 and second left sub-frame 134. Similar to gang mower 10, gang mower 110 can still preferably be pushed forward or moved in reverse when it is in its stowed configuration, so long as proper clearances are maintained. In this case, when gang mower 110 is in its stowed configuration, its weight will be supported in part by the mower unit 12 attached to first sub-frame 120, and in part by a forward section 172 of tractor 170.

As illustrated in FIGS. 6–8, gang mower 110 is intended to be mounted toward the front of tractor 170. Tractor 170 is capable of pushing various types of machinery and preferably includes forward section 172 which is attached by a pivot 180 to a rear section 176. Tractor 170 is turned by pivoting forward section 172 with respect to rear section 176. While forward section 172 has been illustrated including two forward wheels 173 separated by forward axle 174, it should be appreciated that a greater number of wheels could be included on forward section 172. Likewise, while rear section 176 has been illustrated including a pair of rear wheels 177, it should be appreciated that a tractor having a greater number of rear wheels could be used if desired. Tractor 170 includes a seat 181 that is connected to forward section 172 and a steering wheel 183 that is operably coupled to pivot 180.

While the gang mower 110 has been illustrated for use with a tractor having rearward drive wheels, it should be appreciated that it could perform equally well if mounted toward the front of a tractor having front drive wheels. For instance, the present invention would also work well with tractors that include front wheel drive and turn by changing the direction of the rear wheels, e.g. a golf course greens mower type tractors. In addition, gang mower 110 could also be used with a tractor having a conventional forward section. When used with this type of tractor, some means to assist turning the tractor and mower units, such as a hydraulic system, could be included to avoid the sliding problem encountered by previous front mounted gang mowers that have been used with conventional tractors. Therefore, it should be appreciated that gang mower 110 could be used with a variety of tractor types.

Returning now to frame 112, at least one tractor attachment bracket 113, 116 is preferably attached to second sub-frame 121 to facilitate mounting of gang mower 110 on tractor 170 (FIG. 8). Each tractor attachment bracket 113 includes a frame attachment end 115, that is welded to second sub-frame 121, and a tractor attachment end 114 that is positioned behind first sub-frame 120. Tractor attachment end 114 is preferably sized and positioned for attachment to forward axle 174. Each tractor attachment bracket 116 includes a frame attachment end 117 that is preferably welded to frame 112 and a tractor attachment end 118 that is preferably attached to a portion of forward section 172. Tractor attachment brackets 113, 116 and tractor attachment end 114 are capable of pivoting with respect to forward axle 174 about pivot 125 and forward section 172 about pivot 126 to prevent mower units 12 from supporting the weight of tractor 170 and likewise to prevent tractor 170 from supporting the weight of mower units 12. In this way, the weight of frame 112 is preferably supported by the mower units, but the entire gang mower remains maneuverable by the tractor.

While frame 112 has been illustrated attaching to forward axle 174 in a mid-forward position, it should be appreciated that it could be attached to other locations on the front section 172 of tractor 170 and that attachment can be accomplished in any number of ways. For instance, tractor attachment bracket 113 could be sized and positioned for attachment to the front of tractor 170, such that all of gang mower 110 is positioned in front of tractor 170. Additionally, frame 112 could be attached to any suitable location on front section 173 and preferably in a manner that positions at least some of mower units 12 at an easily viewable location in front of forward wheels 173. However, when selecting an attachment position for frame 112, it should be appreciated that the right balance of forces on rear roller 82 should exist and the tractor must have an adequate ability to turn, and there should be adequate down pressure to rotate the drive wheels and cutting reels. Additionally, the method of attachment should allow mower units 80 to be substantially fixed with respect to forward axle 174 to allow greater steering control of gang mower 110. However, some limited yaw ability on the part could be tolerated, and in some instances be desirable. To further increase the ease of steering, it should be appreciated that a majority of the weight of gang mower 110 is preferably located close to forward axle 174 such that tractor 170 can turn gang mower 110 more easily. It is believed that the tractor/mower assembly will have improved turning ability when the mower units are arranged close to the forward axle. Because the reel-type mower units are toward the front of the tractor, a more even cut can be achieved because no flattening of the grass will occur prior to cutting. Further, because most of the mower units are preferably in the direct line of sight of the driver, progress can be constantly monitored without the need for the driver to continuously look behind himself to assure that the gang mower is functioning properly.

It should be appreciated that the force distribution aspect of gang mower 110 is similar to that of gang mower 10. In other words, as shown in FIG. 5, rear roller 82, which is rotatable about a rearward axis 89, is preferably attached to the forward mower via a height adjusting bracket 40. As illustrated, the present invention is preferably attached such that at least a majority of the weight of frame 112 (Wf) is supported by rear rollers 82. Another important aspect of the present invention is that frame 112 is preferably attached lower than forward axis 88, but higher than rearward axis 89. The result is that the net force (Fp+Wf) preferably intersects a line 90 connecting axis 88 and axis 89. It should further be appreciated that when the force distribution of gang mower 110 is contrasted with that of Tobin Jr., the results will be similar to those found when contrasting the force distribution of gang mower 10 with Tobin, Jr. Recall that Tobin, Jr. includes a spring to constantly supply a restoring moment in an attempt to maintain the rollers in contact with the ground and to keep the same from bouncing. Conversely, the present invention sets out to solve the roller bouncing problem of Tobin by ensuring that a sufficient downward force is acting on rear rollers 82 to keep them in contact with the ground. As illustrated, a majority of the weight of frame 112 is preferably supported by rear rollers 82, thereby creating a sufficient downward force to prevent them from bouncing. As previously described for frame 11, while frame 112 has been illustrated as attaching to each mower unit 12 at a position closer to rear roller 82 than forward drive wheels 80, 81, it should be appreciated that the location of the connection relative to rear roller 82 and forward drive wheels 80, 81 is important only with respect to the downward force that is imposed on rear rollers 82 and the leveraging of the drive wheels 80, 81. However, whereas frame 11 is attached to mower unit 12 directly above rear axis 89, frame 112 is attached to side plate 87 at a position forward of rear axis 89. Because the net force (Fp+Wf) still preferably intersects line 90 connecting axis 88 and axis 89, rear roller 82 will be maintained on the ground and there is still sufficient down pressure to rotate drive wheels 80, 81 and cutting reel 85. Therefore, it should be appreciated that because mower head structures vary, attachment can be at any suitable location that keeps rear roller 82 on the ground while creating the down pressure required to rotate drive wheels 80, 81 and cutting reel 85. In other words, frame 112 could be attached to each mower unit 12 at any location between rear rollers 82 and forward drive wheels 80, 81 that provides a sufficient amount of downward force on rear rollers 82 to substantially prevent the same from bouncing when being pushed over the ground. In addition, it is preferable that the combined force from Fp and Wf intersects line 90 such that forward drive wheels 80, 81 are leveraged downward while maintaining rear roller 82 in contact with the ground. Thus, the present invention also contemplates attachment locations above axis 88, provided that an adequate force balance is maintained to drive the front wheels and to maintain the rear roller in contact with the ground.

Returning now to gang mower 110, while it has been shown including seven individual mower units 12, it should be appreciated that this number has been selected for illustrative purposes only. For instance, if a thinner mower swath is desired, second right sub-frame 133 and second left sub-frame 134, and their respective mower units, can be removed. In that instance, the overall gang mower cutting swath would be approximately four feet. Alternatively, if a larger cutting swath is desired, additional outer sub-frames 130 could be added to first sub-frame 120 and second sub-frame 121, and a first set of outer sub-frames 130 could be added to forward sub-frame 119. These new sub-frames could be attached in using extensions 31 and a nut/bolt set 36 as described for the outer sub-frames 130 that have been illustrated. Thus it should be appreciated that gang mower 110 can be modified to accommodate a number of different size cutting swaths.

In addition to the embodiments shown and described above, rear mounted gang mower 10 could also be modified to provide a user with even greater versatility and convenience. For instance, one manner in which gang mower 10 can be modified has been shown in FIG. 9. As illustrated, gang mower 10 still preferably includes three, five or seven reel type mower units 12. However, in this modification, four mower units 12 have been included on forward sub-frame 20 and three have been included on rearward sub-frame 21. In this aspect, forward sub-frame 20 and rearward sub-frame 21 are preferably connected by a pair of horizontal stiffeners 22. A secondary sub-frame 220 is included on gang mower 10 and is preferably attached to forward sub-frame 20 and horizontal stiffeners 22. A bolt 223 preferably attaches the stabilizer bar 84 of central, rear mower unit 12 to secondary sub-frame 220. This feature allows the central, rear mower unit to pivot about a roll axis 225 that passes through bolt 223. In other words, central, rear mower unit 12 has the ability to pivot about roll axis 225 in a manner that allows it to better follow the contours of the ground. In addition to this increased ability to follow the contours of the ground, gang mower 10 can also be modified to increase convenience for the user. As best shown in FIGS. 3 and 4, outer sub-frames 30 can preferably pivot about their individual axes 37a–d to a stowed configuration. In the modification to gang mower 10 shown in FIG. 9, a handle 230 has been attached to each outer sub-frame 30. Handle 230 can be used to better facilitate adjusting gang mower 10 between the stowed or deployed configurations and can be attached to outer sub-frames 30 in any conventional manner and can be formed from any suitable material.

Yet another embodiment of the present invention has been illustrated in FIG. 10. In this embodiment, front mounted gang mower 110 once again includes a forward sub-frame 11 that is preferably attached to a first sub-frame 120 by a pair of arched stiffeners 23, 24. In one possible modification, arched stiffeners could be reoriented into a horizontal plane and relocated to the outer edges of the gang mower. Such a structure could permit the stiffeners to deflect the mowers in the event of a collision with a tree or other object. Note that arched stiffeners 23, 24 are preferably similar in size and composition to those discussed with respect to FIG. 1. First sub-frame 120 is preferably attached to a second sub-frame 121 by a pair of horizontal stiffeners 122, which are preferably similar in size and composition to horizontal stiffener 22, included on gang mower 110, as shown in FIGS. 6–8. However, unlike the previously disclosed embodiment of gang mower 110, the gang mower shown in FIG. 10 has been modified such that a tractor attachment bracket 113 extends rearward from first sub-frame 120 to attach to forward axle 174 of tractor 170. Additionally, in this embodiment of gang mower 110, frame 112 also preferably includes a pair of mounting brackets 175 which will allow gang mower 110 to be attached to tractor 170 at a forward location instead of being attached to a forward axle 174. In this manner, gang mower 110 can be mounted on tractors having forward attachment locations for other lawn or garden accessories. Therefore, it should be appreciated that mounting brackets 175 increase the versatility of gang mower 110 by allowing the same be attached to tractor 170 at a point other than the forward axle.

Another modification to gang mower 110 that has been illustrated in FIG. 10 is the number and arrangement of the individual mower units 12. In this embodiment, second sub-frame 121 still preferably includes two mower units, that are attached to a second right sub-frame 133 and a second left sub-frame 134. However, first sub-frame 120 includes only two mower units 12 that are preferably positioned just behind the front of tractor 170. Extensions 31 are preferably included on first sub-frame 120, such that outer sub-frames 130 and additional mower units could be added to increase the width of the mowing swath. The number of mower units 12 attached to forward sub-frame 119 has also been reduced, in this instance from the two mower units illustrated in FIGS. 6–8 to just one mower unit.

It should be appreciated that while certain aspects of gang mower 110 have been modified for the embodiments shown in FIG. 10, such as location of the attachment bracket, addition of at least one additional mounting bracket and positioning of mower units, the force distribution aspect of gang mower 110 has not been changed. In other words, gang mower 110 still sets out to solve the roller bouncing problem of previous gang mowers by ensuring that a sufficient downward force is acting on rear rollers 82, of the individual mower units, to prevent them from lifting and/or bouncing. In other words, an adequate portion of the weight of frame 112 is still supported by rear rollers 82 in this embodiment, thereby creating a sufficient downward force to prevent them from lifting or bouncing. As described previously, the present invention attempts to solve the roller bouncing problem by providing a sufficient amount of downward weight force on rear rollers 82 to prevent the same from lifting or bouncing when the gang mower is being moved over the ground. In addition, it is important that an adequate downward pressure force be produced by the frame on the drive wheels to rotate the cutting reel Therefore, while frame 112 has been illustrated as attaching to each mower unit 12 at a position closer to rear roller 82 than forward drive wheels 80, 81, it should be appreciated that the location of the connection relative to rear roller 82 and forward drive wheels 80, 81 is important only with respect to the downward force that is imposed on rear rollers 82 and the leveraging of the drive wheels 80, 81.

It should be understood that the above description is intended to serve only in aiding those skilled in this art to understand the present invention, and is therefore intended for illustrative purposes only. Although a number of enhancements to the present invention have been discussed above, those skilled in the art may also recognize additional enhancements to the present invention. For instance, a spiked roller could be substituted for the smooth rollers 82 illustrated for purposes of allowing the user to aerate their lawns as they mow. Another variation might be accomplished by utilizing reel-type mowers that have no rear roller. In such a case, the frame might be supported by its own rollers or wheels attached at strategic locations with the ability to adjust the height of the frame off the ground in order to adjust the cutting height of the individual mower units. Thus, while it may be preferable to use off the shelf reel-type mowers, modifications can be made to the illustrated invention without departing from the intended scope of the present invention.

Still other enhancements to the present invention might include utilizing the present frame with a plurality of golf ball retrievers substituted in place of the reel-type mower units. Such an alternative might prove attractive in retrieving balls at driving ranges. The present invention could also be utilized as a support frame for a number of other lawn implements including aerators, fertilizer units, or any other suitable lawn implement that could be substituted for, or added to, the reel-type mower units illustrated. There is also the possibility of attaching implements requiring electrical power to the frame of the present invention and supplying power via a hook up to the alternator or battery of the garden tractor. This possibility may be especially attractive in attaching a number of weed eater units to the frame in order to cut any stemmy weeds or fesque grasses that are difficult to cut in a single pass with a reel-type mower. Finally, there is also the possibility of mounting a fertilizer tank on the frame and running a number of nozzles from the tank along the rearward base of the frame so that the user could distribute liquid fertilizers over their lawn while cutting. Thus, the above description is clearly not meant to limit in any way the intended scope of the present invention, which is defined solely in terms of the claims as set forth below.

What is claimed is:

1. A gang mower frame comprising:
   a first sub-frame attached to, and arranged in front of, a second sub-frame;
   a plurality of mower attachment brackets being attached to, and extending forward from, said first sub-frame;
   said second sub-frame including at least one tractor attachment bracket; and
   each of said plurality of mower attachment brackets are sized and positioned for attachment to a reel-type mower above its rear roller and behind its drive wheels.

2. The gang mower frame of claim 1 wherein a tractor attachment end of said tractor attachment bracket is positioned between said first sub-frame and said second sub-frame.

3. The gang mower frame of claim 1 wherein said first sub-frame and said second sub-frame are attached by at least two spaced apart connecting members extending between said first sub-frame and said second sub-frame.

4. A gang mower frame comprising:
   a first sub-frame attached to, and arranged in front of, a second sub-frame;
   a plurality of mower attachment brackets being attached to, and extending forward from, said first sub-frame;
   said second sub-frame including at least one tractor attachment bracket; and
   said first sub-frame includes a first right sub-frame and a first left sub-frame that are capable of pivoting to an upright stowed position.

5. The gang mower frame of claim 4 wherein said second sub-frame includes a plurality of mower attachment brackets; and
   said second sub-frame includes a second right sub-frame and a second left sub-frame that are capable of pivoting to an upright stowed position.

6. The gang mower frame of claim 4 further comprising a third sub-frame attached to and positioned in front of said first sub-frame, said third sub-frame including a plurality of mower attachment brackets.

7. A gang mower comprising:
  a frame having a weight and including at least one tractor attachment bracket having a tractor attachment end;
  a plurality of reel-type mowers being attached to said frame, each of said reel-type mowers including at least one rear roller at least one forward drive wheel operably coupled to rotate a cutting reel;
  said tractor attachment end being positioned behind at least one of said reel-type mowers; and
  a majority of said weight being supported by said at least one rear roller.

8. The gang mower of claim 7 wherein each of said reel-type mowers are supported by said at least one forward drive wheel and at least one rear roller; and
  said reel-type mowers are attached to said frame behind said forward drive wheels and at a location closer to said rear roller than said forward drive wheels.

9. The gang mower of claim 7 wherein said tractor attachment end is sized and positioned for attachment to a forward axle of a tractor.

10. The gang mower of claim 7 wherein each of said reel-type mowers are attached to said frame at pivot points, and each of said reel-type mowers can pivot with respect to said frame about a horizontal axes through said pivot points.

11. The gang mower of claim 7 wherein said frame includes a first sub-frame attached to and positioned in front of a second sub-frame;
  said first sub-frame including a first right sub-frame and a first left sub-frame that include a plurality of mower attachment brackets being sized and positioned for attachment to one of said reel-type mowers; and
  said first right sub-frame and said first left sub-frame being capable of pivoting to an upright stowed position.

12. The gang mower of claim 11 wherein said second sub-frame includes a second right sub-frame and a second left sub-frame; and
  said second right sub-frame and said second left sub-frame including a plurality of mower attachment brackets being sized and positioned for attachment to one of said reel-type mowers; and
  said second right sub-frame and said second left sub-frame being capable of pivoting to an upright stowed position.

13. The gang mower of claim 7 wherein said tractor attachment includes a pivot about a horizontal axis.

14. A front mounted gang mower and tractor assembly comprising:
  a tractor including a forward section and a rear section, said forward section and said rear section being attached by a pivot;
  a frame having a weight and being attached to said forward section; and
  a plurality of reel-type mowers having rear rollers and forward drive wheels being attached to said frame; and
  a majority of said weight being supported by said rear rollers.

15. The front mounted gang mower and tractor assembly of claim 14 wherein said frame includes a tractor attachment bracket sized and positioned for pivotal attachment to said forward section.

16. The front mounted gang mower and tractor assembly of claim 14 wherein said frame includes a central portion and a plurality of outer portions; and
  said outer portions are capable of pivoting to an upright stowed position.

17. The front mounted gang mower and tractor assembly of claim 14 wherein said frame includes a first sub-frame attached to and arranged in front of a second sub-frame; and
  said first sub-frame includes a plurality of mower attachment brackets being sized and positioned for attachment to said reel-type mowers behind respective ones of said forward drive wheels.

18. The front mounted gang mower and tractor assembly of claim 14 wherein each of said plurality of reel-type mowers includes at least one forward drive wheel operably coupled to a rotating cutting reel.

19. The front mounted gang mower and tractor assembly of claim 14 wherein said frame is attached to a forward axle of said tractor.

* * * * *